R. W. DAVIS.
RIGHT ANGLE POWER TRANSMISSION.
APPLICATION FILED MAR. 17, 1919.
1,351,470.
Patented Aug. 31, 1920.
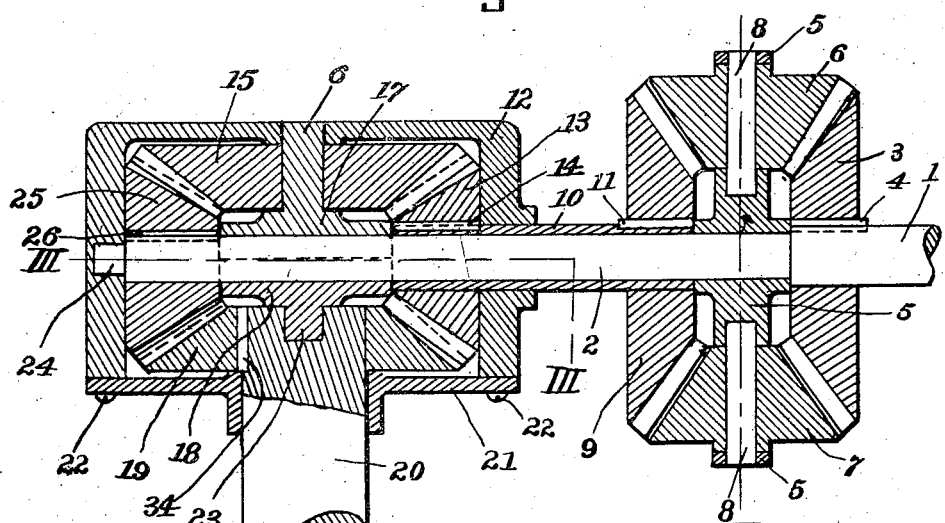
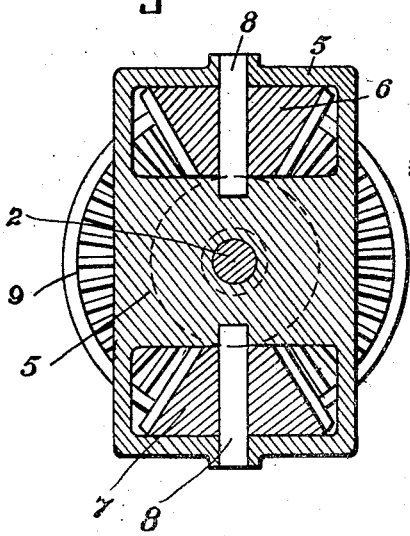
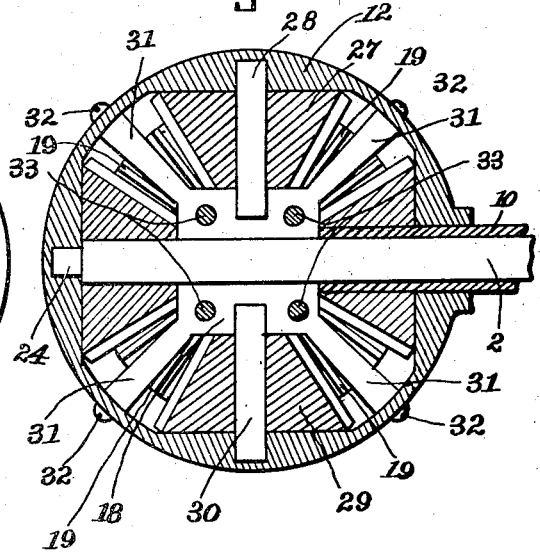
Inventor
Robert William Davis
By Frederick V. Winton,
Attorney.

UNITED STATES PATENT OFFICE.

ROBERT WILLIAM DAVIS, OF HILTONIA, NEW JERSEY.

RIGHT-ANGLE POWER TRANSMISSION.

1,351,470. Specification of Letters Patent. Patented Aug. 31, 1920.

Application filed March 17, 1919. Serial No. 283,141.

*To all whom it may concern:*

Be it known that I, ROBERT WILLIAM DAVIS, a citizen of the United States, residing at Hiltonia, in the county of Essex and State of New Jersey, have invented certain new and useful Improvements in Right-Angle Power Transmission, of which the following is a full, clear, and exact specification.

This invention relates to transmission gearing, and has for its object to provide improved means for transmitting power from a driving shaft to another shaft arranged at right angles thereto. A special object is to provide a right angle transmission that is four times as strong as a single bevel gear meshing with a single bevel pinion, without increasing the diameter of the connection to any great extent. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a sectional view taken axially of the driving and driven shafts through the gear connections.

Fig. 2 is a section on the line II—II of Fig. 1 and

Fig. 3 is a section on the line III—III of Fig. 1.

The driving shaft 1 carries a bevel gear 3 splined thereto, as at 4, and arranged at one side of a stationary frame 5 in which are mounted bevel pinions 6 and 7 on pins 8, said pinions meshing with the gear 3 at diametrically opposite points. A reduced end portion 2 of the shaft 1 extends through and beyond the frame 5, as shown, and on the portion that projects beyond said frame there is mounted a tubular shaft 10 on which is splined at 11 a bevel gear 9 facing the gear 3 and meshing with both of the pinions 6 and 7 at the opposite side of the frame 5 from said gear 3.

The shaft extension 2 and tubular shaft 10, which is loosely mounted around it, both extend into a casing 12 in which is arranged a bevel pinion 13 splined at 14 on the tubular shaft 10. The shaft extension 2 passes through a two-part spider in the casing and has its extremity journaled at 24 in the far wall of said casing. Splined at 26 on the extremity of the shaft 2 is a bevel pinion 25 facing toward the pinion 13, and both of said pinions mesh at diametrically opposite points with facing bevel gears 15 and 19. The supplemental gear 15 is mounted on a stud 16 projecting from the section 17 of the spider, while the gear 19 is mounted on the end of the driven shaft 20 which enters the casing 12 through a cover 21 which is secured in place by screws 22. The gear 19 is, of course, splined on the shaft 20, as at 34, and the inner end of the shaft is preferably journaled on a stud 23 projecting from the section 18 of the spider, it being understood that the two sections 17 and 18 of the spider are assembled from opposite sides of the shaft 2 and held together by screws or bolts indicated at 33 in Fig. 3.

The casing 12 also carries two additional bevel pinions or gears 27 and 29 which are mounted on pins 28 and 30, respectively, and mesh with the gears 15 and 19 at diametrically opposite points and between the pinions 13 and 25. The arms 31 of the spider are secured to the outer walls of the casing 12 by screws 32.

When the driving shaft 1 is rotated power will be transmitted through gear 3, pinions 6 and 7, gear 9, hollow shaft 10, and pinion 13 to the gear 19 on the driven shaft 20. Power from the shaft 1 will also be transmitted through the reduced extension 2 thereof to pinion 25 and by it to the gear 19 on the driven shaft 20. The power derived from the driving shaft as just described is also given up by the pinions 13 and 25 to the gear 15 which in turn transmits its power through the pinions 27 and 29 to the gear 19, so that there are four power driven pinions in mesh with said gear 19 on the driven shaft, giving four times the strength of a single bevel gear and pinion. In tracing the operation of the device, as just described, it should be remembered that the frame 5 is stationary, that there is a load on the driven shaft 20 and that the gears are loose fitting. The gear 19 will, therefore, lag behind until the gear 13 catches up and helps it along owing to the work performed by the gears 3, 6, 7 and 9. Again, owing to the loose fitting of the gears 13 and 25, when the gear 19 lags behind, the gear 15, which is turned by said gears 13 and 25, will turn gears 27 and 29, and said last mentioned gears will catch up with gear 19 and still further help it along.

Having thus described my invention, what I claim as new and desire to secure by Letters Patent of the United States is:—

1. The combination with a driving shaft and a driven shaft arranged at right angles to one another, of a gear fast on the driven shaft, a hollow shaft mounted loosely around the driving shaft, a gear fast on the driving shaft and meshing with said gear on the driven shaft, a gear fast on the hollow shaft and also meshing with said gear on the driven shaft, and means for actuating said hollow shaft from the driving shaft.

2. The combination with a driving shaft and a driven shaft arranged at right angles to one another, of a gear fast on the driven shaft, a hollow shaft mounted loosely around the driving shaft, a gear fast on said hollow shaft and meshing with said gear on the driven shaft, a gear fast on the driving shaft and also meshing with said gear on the driven shaft at a point diametrically opposite to the gear on the hollow shaft, and means for actuating said hollow shaft from the driving shaft and in the opposite direction for the purpose specified.

3. The combination with a driving shaft and a driven shaft arranged at right angles to one another, of a gear fast on the driven shaft, a hollow shaft mounted loosely around the driving shaft, a gear fast on the driving shaft and meshing with the gear on the driven shaft, a gear fast on the hollow shaft and also meshing with the gear on the driven shaft, means, independent of said gears which mesh with the gear on the driven shaft, for actuating the hollow shaft from the driving shaft, a supplemental gear also meshing with the gears on the driving and hollow shafts, and an additional gear interposed between and meshing with said supplemental gear and the gear on the driven shaft.

4. The combination with a driving shaft and a driven shaft arranged at right angles to one another, of a gear fast on the driven shaft, a gear fast on the driving shaft and meshing with said gear on the driven shaft, a supplemental gear also meshing with the gear on the driving shaft, and a plurality of additional gears meshing with the supplemental gear and the gear on the driven shaft.

5. The combination with a driving shaft and a driven shaft arranged at right angles to one another, of a gear fast on the driven shaft, a hollow shaft loosely mounted around the driving shaft, a gear fast on the hollow shaft and meshing with the gear on the driven shaft, means, independent of said gear which meshes with the gear on the driven shaft, for actuating the hollow shaft from the driving shaft, a supplemental gear also meshing with the gear on the hollow shaft, and a plurality of additional gears meshing with said supplemental gear and the gear on the driven shaft.

6. The combination with a driving shaft and a driven shaft arranged at right angles to one another, of a gear fast on the driven shaft, a hollow shaft mounted loosely around the driving shaft, a gear fast on the driving shaft and meshing with the gear on the driven shaft, a gear fast on the hollow shaft and also meshing with the gear on the driven shaft, means, independent of said gears which mesh with the gear on the driven shaft, for actuating the hollow shaft from the driving shaft, a supplemental gear also meshing with the gears on the driving and hollow shafts, and a pair of additional gears meshing with the supplemental gear and the gear on the driven shaft, said additional gears being each arranged between the gear on the hollow shaft and the gear on the driving shaft and at diametrically opposite points on the gear carried by the driven shaft.

7. The combination with a driving shaft and a driven shaft arranged at right angles to one another, of a gear fast on the driven shaft, a plurality of gears meshing with said gear and each operatively connected up to be actuated by the driving shaft, a casing housing said gears, and a removable cover for said casing in which the driven shaft is journaled.

8. The combination with a driving shaft and a driven shaft arranged at right angles to one another, of a gear fast on the driven shaft, a plurality of gears meshing with the gear on the driven shaft and each operatively connected up to be actuated by the driving shaft, a casing housing said gears, and a spider arranged in the casing for retaining the gears in working positions, said spider comprising a central portion through which the driving shaft is passed, and arms extending radially from said central portion between the gears and connected to the casing.

9. The combination with a driving shaft and a driven shaft arranged at right angles to one another, of a gear fast on the driven shaft, a plurality of gears meshing with said gear and each operatively connected up to be actuated by the driving shaft, a casing housing said gears, a spider arranged in the casing for retaining the gears in working positions, and means on the spider to journal the driven shaft.

In testimony whereof I have signed my name to this specification.

ROBERT WILLIAM DAVIS.